United States Patent

Rose

[15] 3,636,276

[45] Jan. 18, 1972

[54] TAPE CARTRIDGE PLAYER TRANSDUCER HEAD CLEANER

[72] Inventor: Harry J. Rose, University, Ohio

[73] Assignee: Tenna Corporation, Cleveland, Ohio

[22] Filed: Nov. 26, 1969

[21] Appl. No.: 880,223

[52] U.S. Cl. ....................179/100.2 Z
[51] Int. Cl. ....................G11b 5/40
[58] Field of Search ..........179/100.2 Z, 100.2 R, 100.2 CA; 274/47

[56] References Cited

UNITED STATES PATENTS 3,439,922 4/1969 Howard ....................274/47
3,443,037 5/1969 Dann ....................179/100.2 CA

*Primary Examiner*—James W. Moffitt
*Assistant Examiner*—Robert S. Tupper
*Attorney*—Baldwin, Egan, Walling & Fetzer

[57] ABSTRACT

A transducer assembly for a cartridge-type tape player which has a wiper arm movable over the pickup surface of the magnetic transducer in wiping engagement therewith so as to clean such surface prior to playing a tape. The wiper arm is operated by the insertion and withdrawal of a conventional tape cartridge into and from the tape player structure so as to move across the playing surface of the transducer to maintain such surface substantially clean of extraneous dust, magnetic materials, and/or other contaminants.

6 Claims, 7 Drawing Figures

INVENTOR
HARRY J. ROSE
Baldwin, Egan, Walling & Fetzer
ATTORNEYS

INVENTOR
HARRY J. ROSE
Baldwin, Egan, Walling & Fetzer
ATTORNEYS

INVENTOR
HARRY J. ROSE
Baldwin, Egan, Walling & Fetzer
ATTORNEYS

TAPE CARTRIDGE PLAYER TRANSDUCER HEAD CLEANER

This invention relates to cartridge-type tape players and more particularly to such a tape player having an electromagnetic transducer or magnetic reproducing head assembly having means for cleaning the pickup surface of the transducer over which magnetic tape is passed.

In conventional cartridge-type tape player structures the tape is passed over an electromagnetic transducer or reproducing head in such manner that the magnetically recorded intelligence on the tape is electromagnetically picked up by the transducer head and transposed through the player structure into audible intelligence. In the repeated use of the tape player, the pickup surface of the transducer becomes contaminated with particles of material such as magnetic dust and/or carbon which may be carried thereto by the tape. As a result the efficiency of the transducer is materially reduced to the point where reproduction quality of the tape player is substantially diminished.

To overcome this deficiency, the the present invention provides a new and novel transducer assembly which has means to periodically clean and wipe the transducer pickup surface before the tape is presented thereto and also at the end of the playing of the tape so that the transducer pickup surface is maintained clean and free of any extraneous material which might otherwise mar its reproduction capability.

It is therefore a primary object of the present invention to provide a new and improved cartridge-type tape player structure in which is provided a transducer head assembly having means to periodically clean and wipe its transducing pickup surface preparatory to playing a magnetic tape thereby.

Another object of the present invention is the provision of a new and improved electromagnetic transducer assembly which includes a wiping mechanism capable of periodically wiping clean the transducing surface of the transducer preparatory to presenting a magnetic tape or the like thereto.

Another object of the present invention is the provision of a new and improved transducer assembly of the above type having a pickup surface-wiping mechanism operated by insertion of the tape cartridge into the player structure.

Additional objects and advantages of the invention will be apparent to one skilled in the art to which it pertains and upon reference to the following disclosure of several preferred embodiments which are illustrated in the accompanying drawings wherein.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

Figure 1:
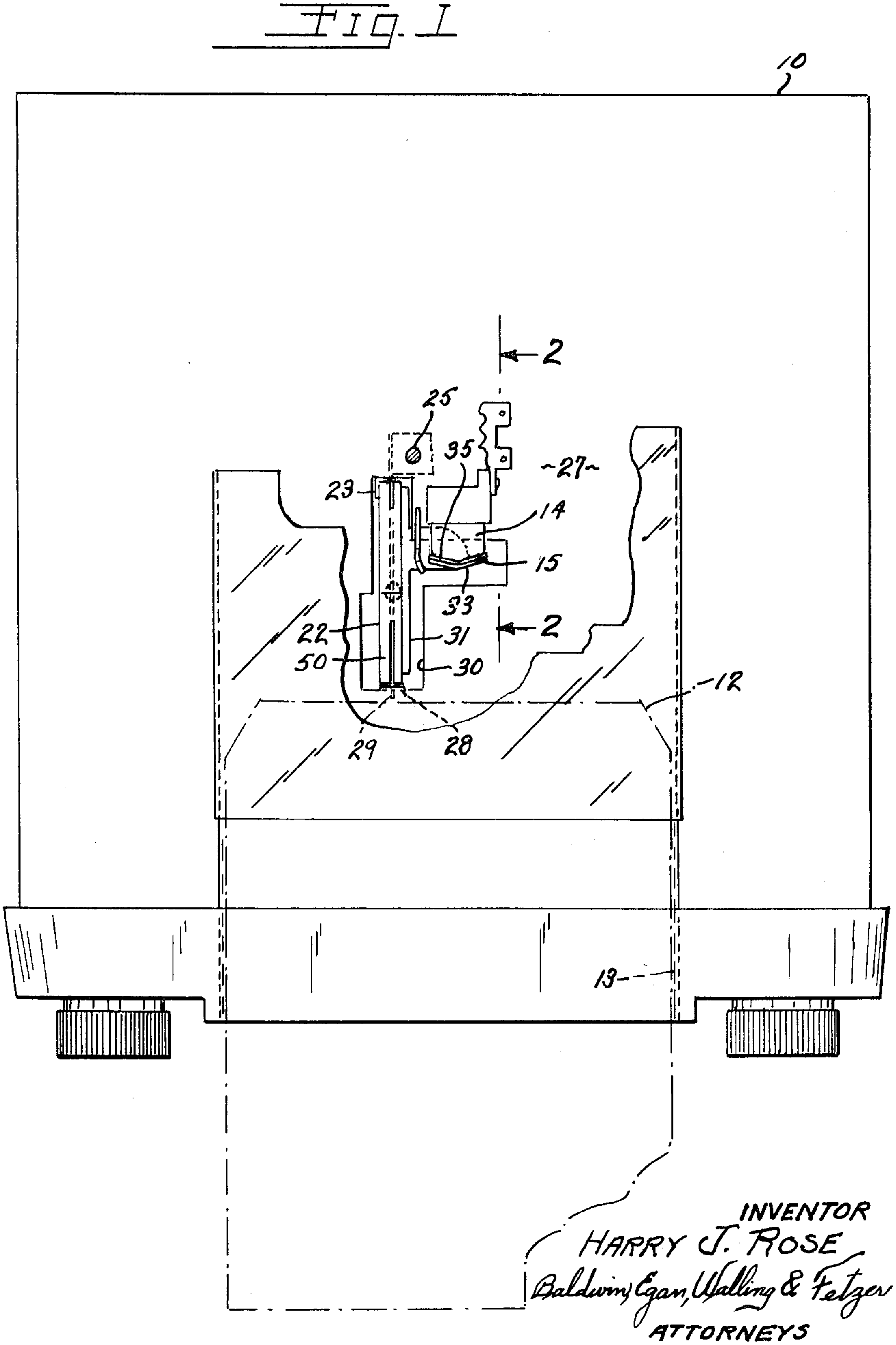
FIG. 1 is a top plan view of a cartridge-type tape player structure in which is incorporated the transducer assembly of the present invention, the casing of the player being cut away partially to show the underlying transducer assembly.

With reference directed first to FIG. 1, there is shown a conventional cartridge-type tape player 10 adapted to accommodate or receive an endless tape cartridge 12. The cartridge 12 is adapted for insertion into a cartridge chamber or guideway 13 to present an endless tape carried therein to an electromagnetic transducer or reproducing head 14 whereby the tape is passed across the partially V-shaped pickup surface 15 and the intelligence on said tape is transduced by said transducer and transposed into audible intelligence in a manner well known in the art.

As heretofore mentioned, as the tape is moved past the surface 15 of the transducer 14, extraneous particles of matter may tend to adhere to said surface and/or the tape as it is passed thereover whereby effective transfer of the intelligence on said tape by the latter is materially diminished.

Specifically, the magnetic properties of the transducer 14 attract foreign particles onto its playing surface whereupon, as the tape is subsequently passed thereover, the electromagnetic transfer of the intelligence on the tape by the transducer is seriously affected.

To prevent this from occurring, the present transducer assembly is provided with mechanism for maintaining the playing surface 15 of the transducer 14 in a relatively clean condition while it is not being used and is operable to wipe said surface 15 just prior to the endless magnetic tape being presented thereto preparatory to the tape player 10 playing the tape.

With reference directed particularly to FIGS. 1 through 4, the transducer cleaning mechanism of the invention includes a slider member or slide 22, which is somewhat polygonal in side elevation. The slide 22 is slidably mounted for vertical reciprocation upon a bracket 23, which is securely attached by fasteners 25 at its back end (FIGS. 2 and 3) to the midsupporting plate 27 of the tape player structure, and at its front end to the plate flange 28 by the tab 29.

Figure 2:
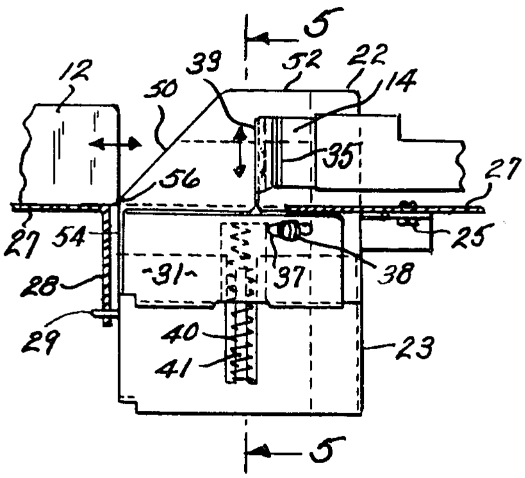
FIG. 2 is a partial side view of the transducer mechanism of the present invention taken approximately on the line 2—2 of FIG. 1.
Figure 3:
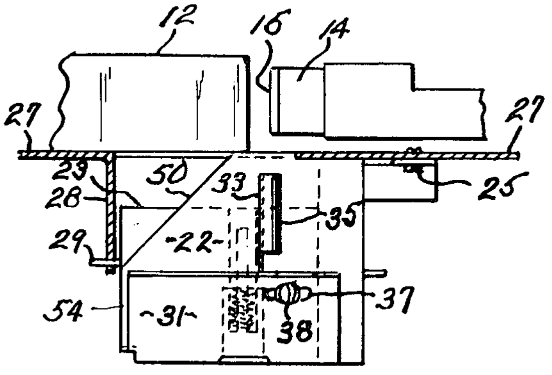
FIG. 3 is a view similar to FIG. 2, but with the transducer wiping mechanism actuated to a remote position.

As shown in FIGS. 2 and 3, the midsupport plate 27 is disposed somewhat below the transducer 14, the bracket 23 thus depending downwardly from said support plate 27. As seen in FIG. 1, the support plate 27 is provided with an opening 30 which is somewhat T-shaped in overall configuration, said opening 30 being formed in the plate 27 so as to permit the slide 22 to freely pass or vertically reciprocate therethrough between its upper or at rest position shown in FIG. 2, whereat it is disposed adjacent to one side of the transducer 14, and its actuated or lower position (FIG. 3) during the interval when a tape cartridge 12 is disposed in the cartridge chamber or guideway 13 so that the endless tape is presented to the transducer 14.

As seen in FIG. 1, the base portion of the T-shaped slot 30 is directly below the transducer 14.

A plate member 31 is adjustably mounted on the side surface of the slide 22 adjacent the transducer 14 and carries thereon a wiper head 33 which has a configuration closely approximating the configuration of the playing surface 15 of the transducer. Thus, the wiper head 33 is an integral part of the slide 22.

A suitable pad of cloth material, such as felt or other like material, as identified at 35, is attached and mounted over the wiper head 33.

The plate 31 is adjustably movable in a horizontal direction on the slide 22 by reason of the slot 37 and screw fastener 38 and is positioned on the slide to bring the felt pad 35 into slight pressure engagement with the surface 15 of the transducer 14, at which point the plate 31 is secured in such position on the slide 22 and secured firmly thereon by the screw fastener 38.

As aforementioned, the at rest or normal position for the slide 22 (FIG. 2) likewise positions the wiper head 33 directly in front and over the surface 15 of the transducer 14, the felt pad 35 thus engaging the latter under slight pressure to completely cover the same and thus prevent extraneous material from being collected thereon during the interval when the player 10 is not in use.

Figure 5:
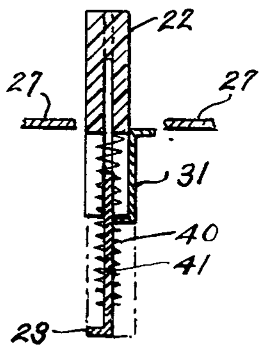
FIG. 5 is a vertical sectional view taken approximately on the line 5—5 of FIG. 4.
Figure 4:
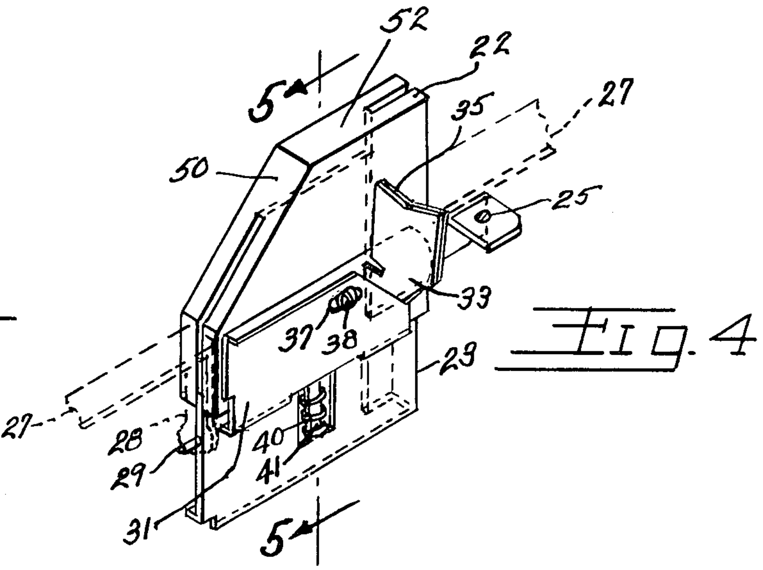
FIG. 4 is a perspective view of the transducer wiping mechanism shown in its normal position preparatory to a cartridge being inserted into the tape player structure.

A suitable bias means in the form of a coil spring or the like, as is indicated at 40 in FIGS. 2 and 5, is placed over a bayonetlike projection 41 formed in the bracket 23, one end of the spring 40 engaging the base of the bayonetlike projection (i.e., bracket 23) and the other end of the spring engaging the underside of the slide 22, thus normally urging said slide upwardly toward and to its normal or at rest position as shown in FIG. 2.

From this latter described position, the transducer wiper head 33 is intended to be moved vertically downwardly therefrom in response to cartridge insertion so as to move the felt pad 35 on the wiper head 33 across the playing surface 15 of the transducer 14, thus wiping said surface and removing therefrom any foreign materials that may have become lodged thereon.

To accomplish this, the slide 22 is provided with an outwardly and downwardly directed surface or inclined plane 50, as best seen in FIG. 2, which begins at the upper surface 52 of the slide 22 approximately at its midpoint, thence projects linearly therefrom and downwardly and forwardly (i.e., outwardly) toward the front edge 54 of said slide 22.

With this structure, when the tape cartridge 12 is placed into the cartridge chamber 13 preparatory to its being presented to the transducer 14 the forward end or adjacent bottom edge portion 56 of said cartridge 12 (FIG. 2) strikes the inclined plane 50 and, upon a continued movement of the cartridge 12 into the chamber 13, forces the slide 22 to move downwardly against the biasing action of the spring 40 to a lower position approximating that as shown in FIG. 3, whereafter the cartridge 12 may be fully inserted into the chamber 13 so as to present the tape to the transducer 14.

As the slide 22 moves downwardly from its FIG. 2 to its FIG. 3 position, the wiper head 33 and its felt pad are likewise moved downwardly across the front pickup surface 15 of the transducer, thus effectively wiping said surface clean of any extraneous materials that may have become lodged thereon.

With this assembly, it will be apparent that each time the slide plate is moved downwardly by the insertion of a cartridge 12 into the player chamber 13, the playing surface 15 of the transducer 14 is wiped clean.

Also, when the cartridge 12 is removed from the chamber 13 after it has been played, the slide 22 moves upwardly through the T-shaped opening 30 through the action of the spring 40 to bring the wiper head 33 and its felt pad again into wiping engagement with the front playing surface 15 of the transducer 14, whereby the latter is wiped clean of any extraneous material that may have adhered thereto.

Figure 6:
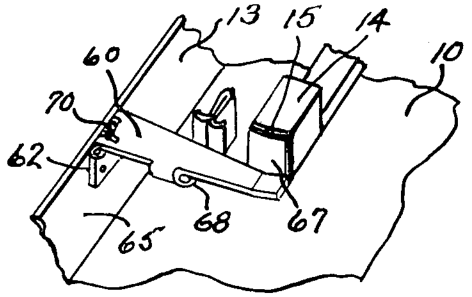
FIG. 6 is a partial perspective view showing a modified form of transducer wiping mechanism of the present invention.

In FIG. 6 is shown an alternative embodiment of transducer cleaning mechanism of the present invention and which includes a wiping arm identified at 60, which has one end attached by a hinge 62 to the upstanding sidewall 65 of the tape player 10, the opposite or free end of said wiping arm mounting a wiper head 67. As shown, the wiper head 67 is disposed forwardly of the playing or pickup surface 15 of the transducer 14 and is likewise intended to have a suitable felt pad or the like adhered to its front surface which is intended to engage said playing surface of the transducer.

The wiping arm 60 is provided with a downwardly and rearwardly depending curved cam as indicated at 68, which is so disposed as to be engaged by the upper front edge of a cartridge 12 as the latter is moved into the chamber 13 preparatory to presenting the endless tape to the transducer 14, whereupon the wiper arm 60 is rotated upwardly and to the left to carry its wiping head 67 across the playing surface 15 of the transducer 14, thus wiping the latter clean.

A suitable hinge (coil) spring 70 carried on the hinge 62 is intended to normally bias said wiper arm 60 to a substantially horizontal position in the guideway 13 as is shown in FIG. 6, such position being effected upon removal of the cartridge 12 from the chamber or guideway 13 which forces said arm 60 to swing downwardly to the right to its normal biased position as shown.

Thus, the invention provides a cartridge-type tape player 10 for receiving a tape cartridge 12 in a cartridge guideway 13 in the player and including a transducer head 14 having a pickup surface 15 over which a tape in the cartridge 12 is passed, such player comprising a wiping means for wiping the transducer pickup surface 15 to keep the same clean, and an actuating means for operating the wiping means responsive to cartridge insertion in the tape player.

In particular, the actuating means, in one form of the invention, includes a slide 22 mounted for vertical movement in the cartridge guideway 13, and the wiping means is a wiper head 33 secured to the slide 22 to wipe the transducer pickup surface 15 when the slide 22 is moved vertically. Specifically, the slide 22 is moved vertically by the tape cartridge 12 when such cartridge is substantially inserted in the cartridge guideway 13. A portion of the wall of the slide 22 facing the cartridge 12 is inclined outwardly and downwardly toward the slide forming an inclined plane 50 whereby, upon insertion of the cartridge 12 in the guideway 13, the adjacent bottom edge portion 56 of the cartridge 12 slidingly contacts the plane 50 to vertically depress the slide 22 and thereby wipe the transducer pickup surface 15.

Bias means are provided which act on the slide 22 to normally retain the same in an upper position wherein the wiper head 33 covers the pickup surface 15 and wherein the wiper head 33 is moved downwardly across the pickup surface 15 when the cartridge 12 vertically depresses the slide 22 to a lower position against the action of the bias means. Such bias means includes a bracket 23 secured to the tape player 10 below the slide 22, and also includes a compressed coiled spring 40 disposed between the bracket and the slide to normally retain the slide in an upper position. The bracket 23 is configured to form a guideway for slidably receiving the slide 22 for vertical reciprocation therein.

The actuating means in another form of the invention is an elongated vertically rotatable wiping arm 60 disposed in the guideway 13, and such wiping means is a wiping head 67 disposed on the arm 60 to wipe the transducer pickup surface 15 when the arm 60 is rotated vertically. The wiping arm 60 is hinged to a sidewall 65 of the guideway 13 for vertical rotation therein, said wiping head 67 being disposed on the free end of the arm 60. Also, the wiping arm 60 has a downwardly and rearwardly extending cam 68 disposed on such arm intermediate the ends thereof, said cam 68 being disposed on the arm 60 whereby on insertion of a cartridge 12 in the guideway 13 the adjacent top edge portion of the cartridge slidingly contacts the cam to vertically rotate the arm 60 upwardly and thereby wipe the pickup surface 15.

Bias means is provided for normally retaining the wiping arm 60 in a substantially horizontal position in the guideway 13 whereby the wiping head 67 covers the pickup surface 15. The bias means in one form of the invention is a coil spring 70 operatively disposed in the hinge portion 62 of the arm 60 to normally retain such arm 60 in a substantially horizontal position in the guideway 13.

Figure 7:
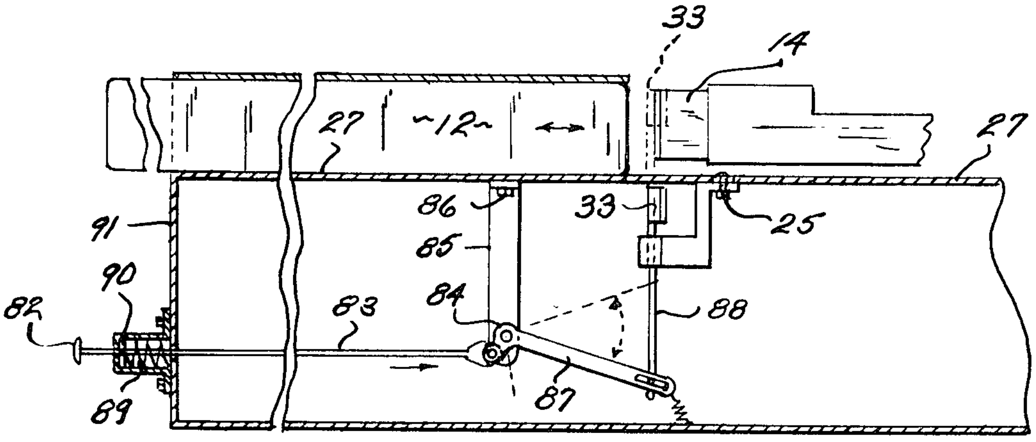
FIG. 7 is a side view of a modification of the invention.

Referring now to FIG. 7, there is shown a modification of the invention wherein the actuating means for actuating the wiping means i.e., wiping head 33) is a pushbutton 82 operatively connected to such wiping means. Specifically, the pushbutton 82 is secured to the outer end of a shaft 83, with the inner end of such shaft being rotatably secured to the lower left edge portion of the crank arm 84. The crank arm 84 is rotatably fastened to the lower end of the bracket 85 which is secured to the supporting plate 27 by the bolt 86. The left end of a lever 87 is rigidly secured to the right side portion of the crank arm 84, with the other end of such lever being operatively secured to the lower end of the rod 88. The upper end of the rod 88 is secured to the wiping head 33.

In operation, when the pushbutton 82 is depressed inwardly or to the right, the shaft 83 moves to the right and rotates the crank arm 84 counterclockwise about its center point thereby causing the lever 87 to move from its lower position as shown in solid line to its upper position as shown in dot-dash lines in FIG. 7, thus moving the rod 88 and the wiping head 33 upwardly to clean the reproducing head 14. A compressed coil spring 89 is interposed between a plate 90 (which is secured to the pushbutton 82) and the front plate 91 to maintain the pushbutton in a normally open position.

What is claimed is:

1. A cartridge-type tape player for receiving a tape cartridge in a cartridge guideway in the player and including a transducer head having a pickup surface over which a tape in the cartridge is passed comprising, a wiping means for wiping the transducer pickup surface to keep the same clean, and actuating means for operating said wiping means responsive to cartridge insertion, said actuating means including a slide mounted for vertical movement in the cartridge guideway, and said wiping means is a wiper head secured to said slide to wipe the transducer pickup surface when the slide is moved vertically.

2. The structure of claim 1 wherein said slide is moved vertically by the tape cartridge when such cartridge is substantially inserted in the cartridge guideway.

3. The structure of claim 2 wherein a portion of the wall of the slide facing the cartridge is inclined outwardly and downwardly toward the slide forming an inclined plane, whereby, upon insertion of the cartridge in the guideway, the adjacent bottom edge portion of the cartridge slidingly contacts said plane to vertically depress the slide and thereby wipe the transducer pickup surface.

4. The structure of claim 3 and further including bias means acting on said slide to normally retain the same in an upper position wherein the wiper head covers the pickup surface and wherein the wiper head is moved downwardly across the pickup surface when the cartridge vertically depresses the slide to a lower position against the action of the bias means.

5. The structure of claim 4 wherein said bias means includes a bracket secured to the tape player below the slide, and a compressed coiled spring disposed between the bracket and the slide to normally retain the slide in an upper position.

6. The structure of claim 5 wherein said bracket is configured to form a guideway for slidably receiving the slide for vertical reciprocation therein.

* * * * *